United States Patent [19]
Morita

[11] Patent Number: 5,140,692
[45] Date of Patent: Aug. 18, 1992

[54] DOCUMENT RETRIEVAL SYSTEM USING ANALOG SIGNAL COMPARISONS FOR RETRIEVAL CONDITIONS INCLUDING RELEVANT KEYWORDS

[75] Inventor: Tetsuya Morita, Yokohama, Japan

[73] Assignee: Ricoh Company, Ltd., Japan

[21] Appl. No.: 533,829

[22] Filed: Jun. 6, 1990

[30] Foreign Application Priority Data

Jun. 13, 1989 [JP] Japan .................. 1-148438

[51] Int. Cl.$^5$ .......................................... G06F 15/40
[52] U.S. Cl. .......................... 395/600; 364/282.1; 364/252.4
[58] Field of Search ... 364/200 MS File, 900 MS File; 395/900, 600

[56] References Cited

U.S. PATENT DOCUMENTS 4,872,008 10/1989 Ohsuka et al. ............ 341/26
5,010,478 4/1991 Deran ...................... 364/200

OTHER PUBLICATIONS

Tsuji, et al., "Software Common knowledge IR System SOCKS (2)", *The 35th National Conference of the Information Processing Society*, 1987.
"Computer Assisted Prior Art Searching", by Becker et al., *Journal of the Patent Office Society*, Oct. 1983, pp. 536–561.

*Primary Examiner*—Lawrence E. Anderson
*Attorney, Agent, or Firm*—Mason, Fenwick & Lawrence

[57] ABSTRACT

A document retrieval system retrieves a registered document from a document database responsive to a designated retrieval condition including one or a plurality of designated keywords. The document retrieval system includes a storage for storing keyword relationships which indicate relationship values of keywords and relations of the keywords and registered documents, an input part for designating a retrieval condition including one or plurality of designated keywords, where the retrieval condition determines a registered document which is to be retrieved from the storage, a selector for selecting a plurality of keyword relationships based on the retrieval condition and for converting the selected keyword relationships into analog signals, an analog operation circuit for calculating a relevance of document based on the analog signals, and a converter for converting the calculated relevance of document into a digital value.

7 Claims, 3 Drawing Sheets

DOCUMENT RETRIEVAL SYSTEM USING ANALOG SIGNAL COMPARISONS FOR RETRIEVAL CONDITIONS INCLUDING RELEVANT KEYWORDS

BACKGROUND OF THE INVENTION

The present invention generally relates to document retrieval systems, and more particularly to a fuzzy document retrieval system which makes a retrieval with moderate quantity and quality by displaying a result of the retrieval in a sequence dependent on the degree of matching with a retrieval condition when a user retrieves from a document database a document which matches a formula of the retrieval condition which is designated.

The present inventor has previously proposed a document retrieval system which generates a group of keywords which are close to the vocabulary or image of the user at a high speed and with a high flexibility in a U.S. patent application Ser. No. 296,769 filed Jan. 13, 1989.

On the other hand, a retrieval system which associatively retrieves an injunction corresponding to a cause based on a software common knowledge IR system by inputting keywords which are obtained from examples of faults which occur in the software development stage is proposed in Hashimoto et al., "Software Common Knowledge IR System SOCKS(1)", The 35th National Conference of the Information Processing Society, 1987 and Tsuji et al., "Software Common Knowledge IR System SOCKS(2)", The 35th National Conference of the Information Processing Society, 1987.

According to the two systems referred above, the result of the retrieval is not displayed in a binary value which indicates "YES" or "NO". These two systems are characterized in that the result of the retrieval is indicated by a value [0, 1] called relevance.

However, when realizing such systems, there is a problem in that an extremely large number of operations must be carried out on real numbers. In addition, such operations are unsuited for a general computer because the number of calculations is proportional to the number of documents.

SUMMARY OF THE INVENTION

Accordingly, it is a general object of the present invention to provide a novel and useful document retrieval system in which the problems described above are eliminated.

Another and more specific object of the present invention is to provide a document retrieval system for retrieving a registered document from a document database responsive to a designated retrieval condition including one or a plurality of designated keywords, comprises storage means for storing keyword relationships which indicate relationship values of keywords, and relations of the keywords and registered documents, input means for designating a retrieval condition including one or plurality of designated keywords, where the retrieval condition determines a registered document which is to be retrieved from the storage means, selection means coupled to the storage means and the input means for selecting a plurality of keyword relationships based on the retrieval condition and for converting the selected keyword relationships into analog signals, analog operation means coupled to the selection means for calculating a relevance of document based on the analog signals received from the selection means, and conversion means coupled to the analog operation means for converting the calculated relevance of document received from the analog operation means into a digital value. According to the document retrieval system of the present invention, it is possible to considerably increase the operation speed because the analog operation is carried out. A high accuracy is not required of the operation, and it is sufficient to make an analog operation of 8 to 12 bits. Furthermore, the structure of the document retrieval system is simple and the document retrieval system can be produced at a low cost. In addition, it is possible to make a parallel processing and a pipe line processing.

Other objects and further features of the present invention will be apparent from the following detailed description when read in conjunction with the accompanying drawings.

DESCRIPTION OF THE PREFERRED EMBODIMENTS

A description will be given of an embodiment of a document retrieval system according to the present invention. In this embodiment, keywords are input by a user. A result of a document retrieval is reported to the user by calculating and sorting relevances of documents for each of the documents. The "relevance of document" (or relevance of text) is an evaluation which describes an amplitude of the relation between keywords which are designated by the user and the documents within the database. The relevance of document is further disclosed in the U.S. patent application Ser. No. 296,769 filed Jan. 13, 1989, the disclosure of which is hereby incorporated by reference.

The following formula (1) describes the relevance of document, where $W_{p,q}$ denotes a "keyword relationship" which indicates an amplitude of the relation (relationship value) between a keyword p and a keyword q, Q denotes a set of keywords used for the retrieval and $D_i$ denotes a set of keywords included in a document having a document number i. Furthermore, the symbol "$\Sigma$" in the formula (1) may denote a summation of ordinary sums or algebraic sums. An algebraic sum $A \oplus B$ is defined as $A \oplus B = A + B - AB$.

$$r_i = \sum_{p \in Q \cap q \in D_i} W_{p,q} \quad (1)$$

Figure 1:
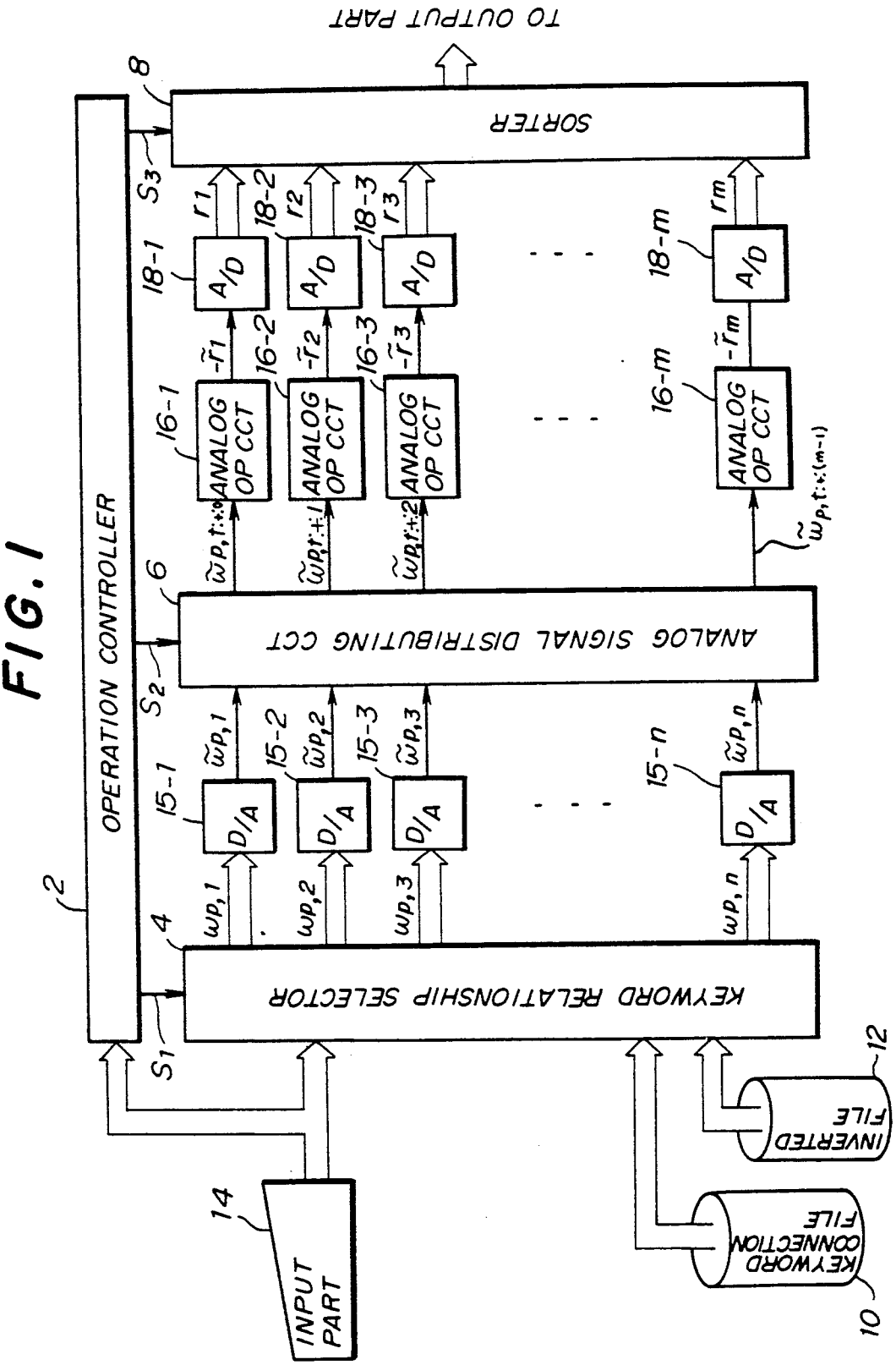
FIG. 1 is a system block diagram showing an embodiment of a document retrieval system according to the present invention.

FIG. 1 shows the embodiment of the document retrieval system according to the present invention. In the document retrieval system shown in FIG. 1, a keyword connection file 10 which stores the relationship values of keywords and an inverted file 12 which stores the relations between keywords and registered documents are coupled to a keyword relationship selector 4 which selects a "keyword relationship" indicating an amplitude of the relationship between keywords. The relationship value corresponds to the value in the keyword connection table which is disclosed in the U.S. patent application Ser. No. 296,769 referred above. An input part 14 through which the user inputs a document retrieval condition is coupled to the keyword relationship selector 4 and an operation controller 2. The document retrieval condition includes one or a plurality of designated keywords. The operation controller 2 supplies timing signals S1, S2 and S3 to the keyword relationship selector 4, an analog signal distributing circuit 6 and a sorter 8, respectively, and synchronizes all the input/output operations among the keyword relationship selector 4, the analog signal distributing circuit 6 and the sorter 8. The timing signal S2 is used as a connection control signal.

A digital-to-analog (D/A) converter 15-i converts a signal $W_{p,i}$ input from the keyword relationship selector 4 into an analog signal $W_{p,i}$ and supplies the analog signal $W_{p,i}$ to the analog signal distributing circuit 6, where i=1, 2, ..., n. An analog operation circuit 16-j calculates an analog relevance of document $-r_j$ from the analog signal $W_{p,(t:+j)}$ input from the analog signal distributing circuit 6 and outputs the calculated analog relevance of document $-r_j$, where j=1, 2, ..., m. An analog-to-digital (A/D) converter 18-j converts the relevance of document $-r_j$ into a digital value $r_j$ and supplies this digital value $r_i$ to the sorter 8 which sorts and outputs the digital values (relevances of documents) depending on the order of relevance.

Next, a description will be given of the operation of this embodiment. One or a plurality of designated keywords which are used for the document retrieval and are input from the input part 14 by the user are supplied to the keyword relationship selector 4. The keyword relationship selector 4 extracts one keyword from the set of keywords, and reads all keyword relationships KR from the keyword connection file 10 for the extracted keyword. The read keyword relationships KR are supplied to the D/A converters 15-1 through 15-n. For example, when the first keyword is p, $W_{p,1}$ through $W_{p,k}$ are respectively supplied to the D/A converters 15-1 through 15-k, where k denotes the number of keyword relationships KR for the keyword p. When a number n of the D/A converters 15-1 through 15-n is smaller than the number k of keyword relationships KR, that is, when n<k, $W_{p,1}$ through $W_{p,n}$ are respectively supplied to the D/A converters 15-1 through 15-n. In addition, when n>k, "0" is supplied to the D/A converters 15−(k+1) through 15-n as $W_{p,k+1}$ through $W_{p,n}$.

Figure 2:
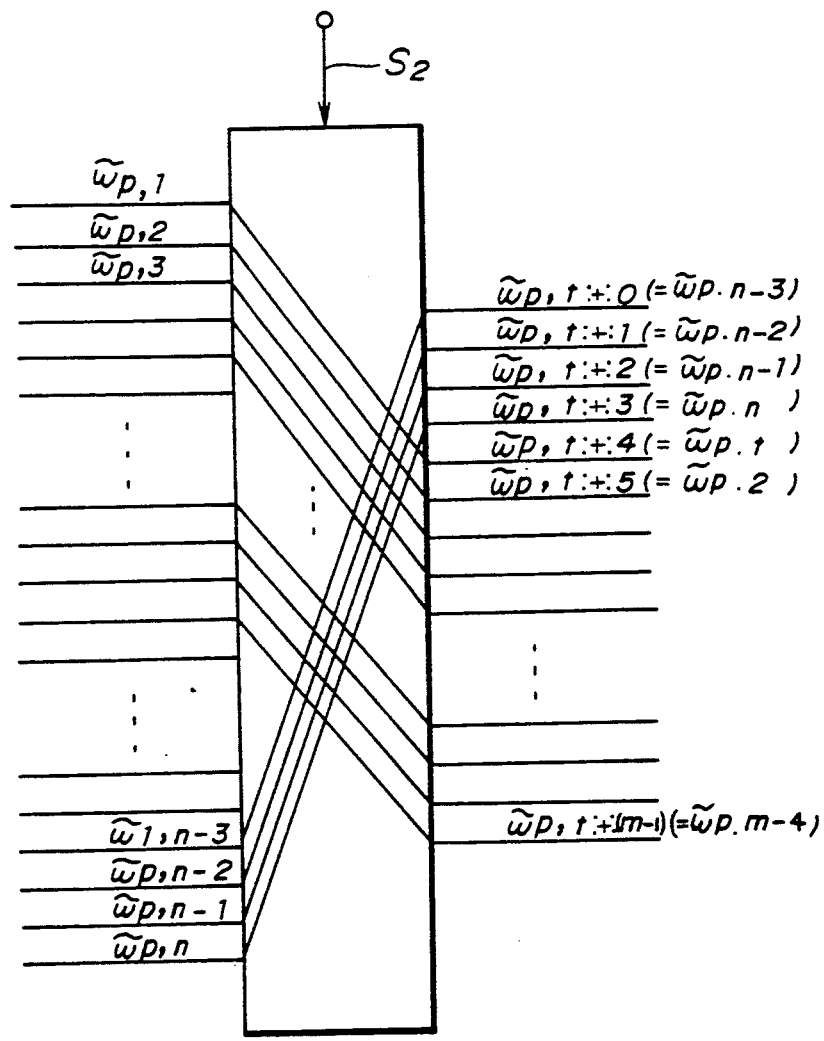
FIG. 2 is a system block diagram showing an embodiment of an analog signal distributing circuit shown in FIG. 1.

Analog signals $W_{p,1}$ through $W_{p,n}$ which are output from the D/A converters 15-1 through 15-n are supplied to the analog signal distributing circuit 6. FIG. 2 shows an embodiment of the analog signal distributing circuit 6. In this embodiment, it is assumed that the number m of analog operation circuits 16-1 through 16-m is smaller than the number n of D/A converters 15-1 through 15-n. In FIG. 2, a symbol ":+:" denotes an operator for obtaining an added result of a modulo-n addition. A connection state of the analog signal distributing circuit 6 changes depending on the connection control signal (timing signal) S2. For example, when t=1, inputs $W_{p,1}$ through $W_{p,m}$ are respectively connected to outputs OUT1 through OUTm of the analog signal distributing circuit 6 as they are. When t=2, inputs $W_{p,2}$ through $W_{p,m+1}$ are respectively connected to the outputs OUT1 through OUTm. FIG. 2 shows a connection state for the case where t=n−3. In other words, by inputting the connection control signal S2 for every predetermined time unit and repeating this operation n times, it is possible to respectively connect the inputs $W_{p,1}$ through $W_{p,n}$ to the outputs OUT1 through OUTm for the predetermined time unit.

Figure 3:
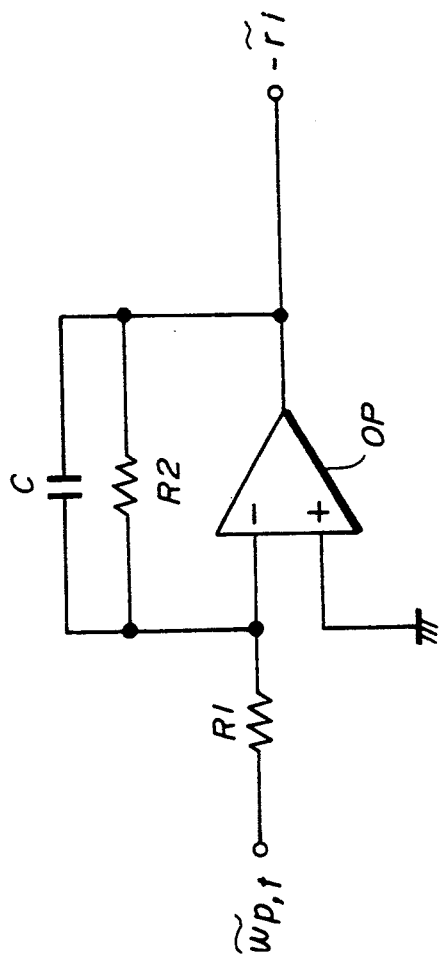
FIG. 3 is a circuit diagram showing an embodiment of an analog operation circuit shown in FIG. 1.

FIG. 3 shows an embodiment of the analog operation circuit 16-j. The analog operation circuit 16-j includes resistors R1 and R2, a capacitor C and an differential amplifier OP. The analog operation circuit 16-j is essentially an analog integration circuit which produces an inverted output. The input $W_{p,t}$ is integrated for every predetermined time unit described above, and a result of the integration is output as $-r_i$. When the inputs $W_{p,1}$ through $W_{p,n}$ are obtained, a summation of $W_{p,1}$ through $W_{p,n}$ is obtained as the result of the integration when the predetermined time unit is repeated n times. However, since $r_i$ is the relevance of document for the document i in this case, the summation is obtained only for the relationships that p of $W_{p,q}$ belongs to the set of keywords used for the retrieval and q of $W_{p,q}$ belongs to the set of keywords included in the document i as given by the formula (1). The relevance of document $r_i$ becomes as described by the formula (1) by appropriately modifying the value of $W_{p,q}$ in the following manner by the keywords included in the document i out of all the relationships for the keyword p.

Input $W_{p,q}$ to the D/A converter 15-i when q∈ Di
Input "0" to the D/A converter 15-i when q∉ Di By carrying out the above described control in synchronism with the connection control signal S2, it is possible to integrate an appropriate $W_{p,q}$ for the keyword p in n predetermined time units. In addition, all m relevance of documents can be calculated from (number of keywords included in the set of keywords used for the retrieval)*(n predetermined time units).

For example, it is assumed for the sake of convenience that a set Q made up of K keywords used for the retrieval is input from the input part 14. In this case, the relevance of document $r_i$ is given by the formula (1). The keyword relationship selector 4 first selects one keyword from the set Q. If the selected keyword is p, the value which is input from the keyword relationship selector 4 to the D/A converters 15-1 through 15-i changes as follows depending on a time unit t.

That is, when keyword $(t+0)\epsilon D_{t+0}$, $W_{p,t+0}$ is input to the D/A converter 15-1. When keyword $(t+0)\epsilon D_{t+0}$ does not stand, "0" is input to the D/A converter 15-1. Similarly, when keyword $(t+1)\epsilon D_{t+1}$, $W_{p,t+1}$ is input to the D/A converter 15-2. When keyword $(t+1)\epsilon D_{t+1}$ does not stand, "0" is input to the D/A converter 15-1. Therefore, when $(t+i-1)\epsilon(D_{t+i-1})$, $W_{p,t+i-1}$ is input to the D/A converter 15-i, and "0" is input to the D/A converter 15-i when $(t+i-1)\epsilon(D_{t+i-1})$ does not stand, where (t+i−1) indicates a keyword (t+i−1).

By repeating the above described operation n predetermined time units for all keywords included in the keyword Q, it is possible to calculate the relevance of document $r_i$ described by the formula (1) for m documents.

Further, the present invention is not limited to these embodiments, but various variations modifications may be made without departing from the scope of the present invention.

What is claimed is:

1. A document retrieval system for retrieving a registered document from a document database responsive to a designated retrieval condition including one or a plurality of designated keywords, said document retrieval system comprising:
a) storage means for storing:
 1) keyword relationships which indicate relationship values of keywords; and
 2) relations of the keywords and registered documents; the storage means having a storage means output portion;
b) input means for designating a retrieval condition including one or a plurality of designated keywords, said retrieval condition determining a registered document which is to be retrieved from said storage means based upon an analog signal comparison, the input means having an input means output portion;
c) selection means, coupled to said storage means via the storage means output portion and coupled to said input means via the input means output portion, for:
 1) selecting a plurality of keyword relationships based on the retrieval condition; and
 2) converting the selected keyword relationships into analog signals; the selection means having a selection means output portion;
d) analog operation means, coupled to said selection means via the selection means output portion, for calculating a relevance of document based on the analog signals received from said selection means, the analog operation means having an operation means output portion; and
e) conversion means, coupled to said analog operation means via the operation means output portion, for converting into a digital value the calculated relevance of document received from said analog operation means via the operation means output portion, the conversion means having a conversion means output portion.

2. The document retrieval system as claimed in claim 1 wherein said selection means includes:
a selector coupled to (1) said storage means by the storage means output portion and to (2) said input means by the input means output portion, the selector for selecting the keyword relationships based on the retrieval condition, the selector having a selector output portion;
a digital-to-analog converter part, coupled to the selector by the selector output portion, for converting the selected keyword relationships into the analog signals, the digital-to-analog converter part having a digital-to-analog output portion; and
an analog signal distributing circuit, coupled to the digital-to-analog converter part by the digital-to-analog converter output portion, the analog signal distributing circuit for distributing the analog signals to said analog operation means.

3. The document retrieval system as claimed in claim 1 wherein:
said analog operation means includes an integration circuit, the integration circuit obtaining the relevance of document based on the analog signals received from said selection means.

4. The document retrieval system as claimed in claim 1 wherein:
the relevance of document is described by the formula, $$r_i = \sum_{p \in Q \cap q \in D_i} W_{p,q}$$

wherein:
$W_{p,q}$ denotes a keyword relationship between a keyword p and a keyword q,
Q denotes a set of designated keywords included in the designated retrieval condition,
$D_i$ denotes a set of keywords included in a document having a document number i, and
"$\Sigma$" denotes ordinary summation.

5. The document retrieval system as claimed in claim 1 wherein the relevance of document is described by the following formula, $$r_i = \sum_{p \in Q \cap q \in D_i} W_{p,q}$$

wherein:
$W_{p,q}$ denotes a keyword relationship between a keyword p and a keyword q,
Q denotes a set of designated keywords included in the designated retrieval condition,
$D_i$ denotes a set of keywords included in a document having a document number i,
"$\Sigma$" denotes a summation of algebraic sums, and
an algebraic sum $A \oplus B$ is defined herein as $A + B - AB$.

6. The document retrieval system as claimed in claim 1, further comprising:
a sorter for sorting each digital value output received from said conversion means via the conversion means output portion.

7. The document retrieval system as claimed in claim 1, further comprising:
control means for controlling operation timing of said input means, said selection means, said analog operation means and said conversion means.

* * * * *